Patented Feb. 14, 1939

2,147,338

UNITED STATES PATENT OFFICE 2,147,338

MONO-AMINO-MONO-AZO DYESTUFFS

Friedrich Felix, Basel, Rudolf von Capeller, Riehen, near Basel, and Wilhelm Huber, Basel, Switzerland, assignors to Society of Chemical Industry in Basle, Basel, Switzerland No Drawing. Application August 28, 1936, Serial No. 98,406. In Switzerland September 7, 1935

12 Claims. (Cl. 260—198)

This invention relates to the manufacture of new mono-amino-mono-azo-dyestuffs by combining a diazo-compound of an aromatic amine with a coupling component of the general formula

in which A stands for a member of the group of nuclei consisting of the benzene and naphthalene series, and $R_1$ and $R_2$ stand for members selected from the group consisting of hydrogen, alkyl, aryl and aralkyl, the conditions of coupling being chosen in such a manner that the

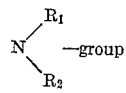

is the group which directs the coupling, and the component being so selected that the dyestuff molecule contains at least twice the —$SO_2$—R group, in which R stands for a radical selected from the group consisting of alkyl, aralkyl and aryl. These products correspond therefore to the general formula

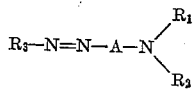

in which $R_3$ and A stand for members of the group of nuclei consisting of the benzene and naphthalene series, in which further $R_1$ and $R_2$ have the signification indicated above, and in which finally on the two nuclei $R_3$ and A at least two —$SO_2$—R groups are distributed, R having the signification indicated above.

The dyestuffs thus obtained are orange to red and dark powders, which are excellently suitable for dyeing textiles of various kinds, for example wool, silk, artificial silk, cellulose, particularly esters and ethers thereof, for example acetylcellulose and other conversion products of cellulose, such as nitrocellulose, etc. The dyestuffs are also suitable for dyeing lacquers, varnishes and plastic masses, particularly nitrocellulose and phenol-formaldehyde lacquers. They dye these products the same tints as the textiles, unsulfonated dyestuffs being particularly suited for this purpose. They can be used as intermediate products for the manufacture of further dyestuffs. Whereas the sulfonated dyestuffs are particularly valuable for dyeing and printing wool and for printing acetate artificial silk, the non-sulfonated dyestuffs, when brought into suitable form or suspended in a suitable medium, have a pronounced affinity for cellulose esters and ethers, particularly acetate artificial silk.

Among these dyestuffs those are particularly important which are obtained when the diazo-compound of an aromatic amine of the formula

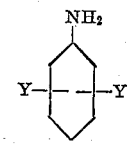

in which each of the two Y's stands for a —$SO_2$—R-group, R standing for a substituent of the group consisting of alkyl, aralkyl and aryl radicals, in which further these two Y's do not stand in ortho position to each other, and in which at the most one of the two Y's stands in ortho-position to the $NH_2$-group, is united with such a coupling component in which the group which directs the coupling is a non-substituted or substituted amino-group.

Among the bases suitable for production of the diazo-compounds of the above explained general formula

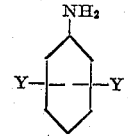

are the following aminoaryl disulfones: 1-aminobenzene-2,4-dialkyl-disulfones, for instance 1-aminobenzene-2,4-dimethyldisulfone, 1-aminobenzene-2,4-diethyl- and -dipropyl-disulfone; the corresponding aralkyl and aryl disulfones, for instance 1-aminobenzene-2,4-dibenzyl- or -dichlorobenzyldisulfone: 1-aminobenzene-2,4-diphenyl-disulfone, 1-aminobenzene-2,4-diphenylalkyl- and -alkoxydisulfone, 1-aminobenzene-2,5-dialkyldisulfone, for instance 1-aminobenzene-2,5-diethyldisulfone, the corresponding aralkyl- and arylsulfones, for instance 1-aminobenzene-2,5-dibenzyldisulfone, 1-aminobenzene-2,5-diphenyldisulfone. There may also be used sulfones in which the aryl, aralkyl or alkyl residues are different, for example 1-aminobenzene-2,5-benzylmethyldisulfone, 1-aminobenzene-2,5-phenylmethyldisulfone, 1-amino-2,4-ethylmethyldisulfone, 1-aminobenzene-2,4-ethylbenzyldisulfone, 1-aminobenzene-2,4-phenylethyldisulfone, 1-aminobenzene-2,4-phenylbenzyldisulfone. The corresponding products of the naphthalene series also come into consideration, for instance 2-aminonaphthalene-4,8-diethyldisulfone, 1-aminonaphthalene-2,4-diethyl- or -dimethyldisulfone.

These bases may contain further substituents, such as alkyl residues, alkoxy-groups, nitro-groups, sulfonic acid groups.

According to the choice of the diazo-compound corresponding to the above explained general formula

and the coupling component a dyestuff is obtained which dyes animal fibres or shows a good affinity to esters and ethers of cellulose, for example to acetate artificial silk. If the dyestuff obtained has in any part of its molecule a sulfonic acid group it is suitable for dyeing animal fibres or for printing on acetate artificial silk, while the dyestuffs which are sparingly soluble in water, for instance those which are free from sulfonic acid groups are particularly suitable for dyeing acetate artificial silk. Such dyestuffs are particularly obtained by using a diazo component of the kind which contains no sulfonic acid group and as coupling component a simple aromatic base, for instance aniline or a homologue or analogue thereof. Thus there may be used aniline, ortho- or meta-toluidine, para-xylidine, para-cresidine, 2,5-dihydroxyalkylaminobenzene, naphthylamines, hydroxynaphthylamines, for instance 1,5-aminonaphthol, 2,8-aminonaphthol; also the amines which are arylated, alkylated, aralkylated or hydroxyalkylated in the amino-group and such hydroxyalkylated amines as contain the hydroxy-group in etherified or esterified condition. The properties of fastness of the tint of materials treated with these dyestuffs differ profoundly with the choice of the substituent.

Among the coupling components which come into consideration for making wool dyestuffs may be named the amino- or amino-hydroxy-compounds of the benzene and naphthalene series, for instance α- and β-naphthylamines and their sulfonic acids, the α- and β-naphthylamines which are alkylated at the nitrogen, for instance ethyl-β-naphthylamines and their sulfonic acids. There may also be used amino-hydroxy-naphthalene, especially 1,5-amino-hydroxynaphthalene, for instance 1,5-amino-hydroxynaphthalene-7-sulfonic acid, 1,5-amino-hydroxynaphthalene-2-sulfonic acid, also 2,8-amino-hydroxynaphthalene, 2,8-amino-hydroxynaphthalene-6-sulfonic acid and its substitution products alkylated or arylated at the nitrogen, for instance 2-phenylamino-8-hydroxynaphthalene-6-sulfonic acid. There are also suitable bases of the aromatic series, for instance diphenylamine and its sulfonic acids, alkylaniline, for instance ethylbenzylaniline, ethylbenzylaniline sulfonic acid.

All these dyestuffs which are a particularly valuable group of the dyestuffs of the present application, correspond to the general formula

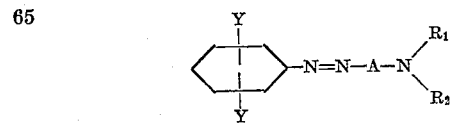

in which the two Y's, A, R₁ and R₂ have the signification indicated above. They are dark powders soluble in pyridine to yellow to orange to red to violet to blue and green-blue solutions and dyes the various fibers similar tints. Quite generally the new compounds are characterized by their capacity for dyeing tints leaning towards the blue end of the spectrum, so that it is possible when using diazotizing components containing known nitro-groups to obtain violet to blue and glue-green dyeing monoazo-dyestuffs. This valuable displacement of the shade takes place particularly in those dyestuffs in which the one y stands in ortho-position to the —N=N-group and especially in those dyestuffs in which the second y stands in para-position to the —N=N-group i. e. in dyestuffs of the general formula

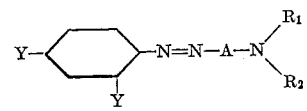

Further, those dyestuffs are particularly valuable in which the radical A of the coupling component corresponds to a nucleus of the naphthalene series, and those dyestuffs are again particularly valuable which correspond to the general formula

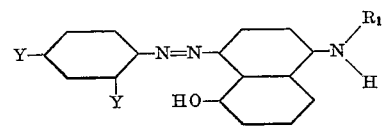

in which the sulfonic radicals which are designated by the Y's represent —SO₂-alkyl, viz. such alkyls which have a low molecular weight, i. e. having 1 to 3 carbon atoms. If in the last named formula R₁ represents an alkyl group, this expression covers also cyclic alkyls, i. e. for example dyestuffs of the formula

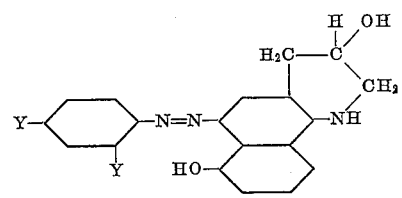

The present invention, however, is not restricted to dyestuffs from a diazotizing component of the general formula

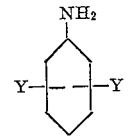

for, if the diazo compound contains only one sulfonic group, or if it is desired to obtain a dyestuff which has more than two sulfonic groups there may be used as coupling component an amine or an amino-hydroxy-compound which contains a sulfonic group and notwithstanding still contains a hydrogen atom capable of exchange for a diazo-compound. These are particularly aromatic amines which contain the sulfonic groups in meta-position to the group which renders coupling possible, namely the amino-group or the alkyl-, aralkyl- or arylamino-group. Examples are 1-aminobenzene-3-methylsulfone, 1-dimethylaminobenzene-3-methylsulfone or 1-dihydroxyethylamino-benzene-3-methyl- or -ethylsulfone; similar products in the naphthalene series may be used, for instance 2-aminonaphthalene-6-methylsulfone or a substitution product in which the amino-group is alkylated or arylated.

The dyestuffs containing sulfonic acid groups dye wool in an acid bath. The insoluble dyestuffs which are suitable for dyeing acetate artificial silk are preferably first brought into a fine state of subdivision, for instance by grinding with one of the usual dispersing agents, for example sulfite cellulose lye, the sulfonated residues of benzaldehyde manufacture or the like. By cautiously drying such pastes especially suitable dyestuff preparations are obtained.

According to the choice of the components of the dyestuff the tints obtained on the said materials are yellow to red and blue-red to violet, blue and green. These dyestuffs are distinguished by the remarkable fastness to light and good fastness to washing of their dyeings, particularly the dyeings on wool. They are suitable to a surprising extent for producing combination shades because in certain cases they have a quite remarkable levelling capacity.

The following examples illustrate the invention without however, limiting the scope of the same, the parts being by weight; the relationship between parts by weight and parts by volume is that which exists between the kilogram and the litre:

*Example 1*

249 parts of 1-aminobenzene-2,4-dimethyldisulfone are diazotized in solution in hydrochloric acid or sulfuric acid and there is gradually added whilst stirring well a neutral solution of 239 parts of 2-amino-8-hydroxynaphthalene-6-sulfonic acid. The whole is stirred until the coupling, which may be accelerated by careful addition of a material which binds acid or has a buffer action, is completed. The mixture is then neutralized and the dyestuff precipitated, if desired with the aid of common salt. It is filtered and dried. It is a dark powder corresponding to the formula

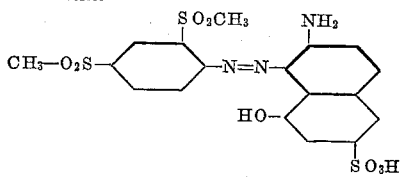

soluble in water and in pyridine to a Bordeaux red solution and dyeing wool in an acid bath fast red-violet tints.

Similar results are obtained by using 1-aminobenzene-2,4-diethyldisulfone, while by using for example dibenzyldisulfones bluer dyeings are obtained. The dyestuff from 1-aminobenzene-2,5-dimethyl- or -diethyldisulfone dyes somewhat more yellow tints. If for example 1-aminobenzene-3,5-dimethylsulfone is diazotized and the diazo-compound mixed with 2-amino-8-hydroxynaphthalene-6-sulfonic acid, there is obtained a dyestuff which dyes wool red tints.

*Example 2*

Into the diazo-solution from 249 parts of 1-aminobenzene-2,4-dimethyldisulfone there is allowed to run a neutral solution of 239 parts of 1-amino-5-hydroxynaphthalene-7-sulfonic acid. If desired the coupling may be accelerated by adding sodium acetate. The precipitated dyestuff is filtered and washed until neutral with sodium chloride solution. The new dyestuff corresponding to the formula

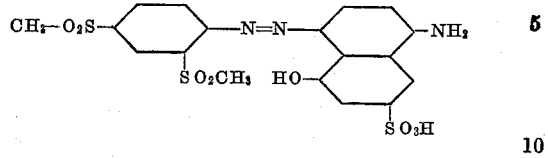

is a green powder and soluble in water and in pyridine to a blue solution and dyeing wool in a bath acid with acetic acid pure blue tints. Like results are obtained by using 1-aminobenzene-2,4-diethyldisulfone. Dyeings which are more fast to washing are produced when the corresponding dibenzyldisulfones are used. Also when 1-aminobenzene-2,5-benzylmethyldisulfone is used.

When 1-amino-5-hydroxynaphthalene-8-sulfonic acid is substituted for 1-amino-5-hydroxynaphthalene-7-sulfonic acid there is obtained a dyestuff which dyes a blue somewhat more greenish and more pure, whereas when 1-amino-5-hydroxynaphthalene-2-sulfonic acid is used there is obtained a somewhat redder blue. Instead of 1-aminobenzene-2,4-dimethyldisulfone there may be used 1-aminobenzene-2,4-ethylmethyldisulfone or 2,4-phenylbenzyldisulfone or 2,4-dibenzyldisulfone or also 2,4-diphenyldisulfone, similar results being obtained in each case. Blue dyeing dyestuffs are also obtained by coupling 1-aminobenzene-2,4-dimethyldisulfone with N-phenylaminonaphthalene-8-sulfonic acid. 1-aminobenzene-2,4-diethyldisulfone may also be coupled with 2-benzylaminonaphthalene-6-sulfonic acid or with 2-ethylaminonaphthalene-6-sulfonic acid, dyestuffs being thereby obtained which dye wool bluish red tints.

*Example 3*

249 parts of 1-aminobenzene-2,4-dimethyldisulfone are diazotized by means of 70 parts of sodium nitrite and 250 parts by volume of concentrated hydrochloric acid in the usual manner with addition of ice. The clear diazo-solution thus obtained is coupled with a solution of 159 parts of 1-amino-5-hydroxynaphthalene and the necessary proportion of dilute hydrochloric acid. The dyestuff thus formed is filtered when coupling is complete and washed until neutral. When dry the new dyestuff of the formula

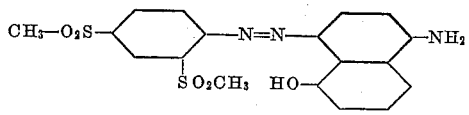

is a dark powder soluble in organic solvents, for instance acetone or ethyl acetate and in pyridine to a blue solution and when brought into suitable dispersion dyes cellulose esters and ethers violet blue tints. It may also be used for coloring lacquers, varnishes and artificial masses.

If instead of 1-amino-5-hydroxynaphthalene there is used the corresponding quantity of meta-toluidine, 1-amino-5-methyl-2-hydroxybenzene-methyl ether or 1-aminobenzene-2,5-dimethyl ether there is obtained a dyestuff which dyes yellow to orange tints of similar properties of fastness. When aminobenzenes which are hydroxyalkylated at the nitrogen are used the dyestuffs obtained have an increased affinity for the esters and ethers of cellulose. The hydrogen of the hydroxyl-groups may be substituted by alkyl or acetyl residues. As such components the products of French Patent No. 758,079 come particularly into question.

*Example 4*

249 parts of 1-aminobenzene-2,4-dimethyldisulfone are diazotized by means of 70 parts of sodium nitrite and 250 parts by volume of concentrated hydrochloric acid with addition of ice in the usual manner. The diazo-solution is coupled with a solution of 179 parts of the methyl ether of ethyl-ω-hydroxyethylaniline in dilute hydrochloric acid, sodium acetate being added to complete the coupling. The dyestuff thus formed of the formula

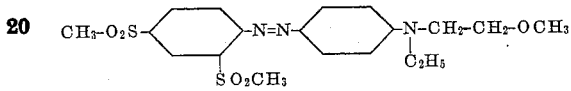

dissolves when dry in organic solvents, for instance acetone or ethyl acetate and in pyridine, the solution being orange and when suitably dispersed dyes cellulose esters and ethers orange tints. It may also be used for coloring lacquers. A similar dyestuff is obtained by using ethyl hydroxyethyl-aniline. A dyestuff dyeing red is obtained by coupling diazotized 1-aminobenzene-2,4-dimethyldisulfone with 5-methoxy-2-methyl-1-(dimethoxyethyl)-aminobenzene. When a 1-aminobenzene-3-methylsulfone alkylated or hydroxyalkylated at the nitrogen is used as coupling component there is obtained a dyestuff which dissolves in lacquers to a yellow solution. Other products soluble in lacquers may be obtained by coupling diazotized 1-amino-4-nitrobenzne-2-methylsulfone with one of the last named coupling components. Dyestuffs which are also suitable for dyeing lacquers, esters and ethers of cellulose are obtained by diazotizing 1-aminobenzene-2,4-dimethyldisulfone and coupling with 1-acethylamino-3-methylsulfone-2'-methyl-4,4'-diphenylamine which is preferably dissolved in glacial acetic acid. This compound is obtained by condensation of 1-chloro-4-nitrobenzene-2-methylsulfone with 1-amino-3-methylbenzene, the nitro group is then converted into the amino-group by reduction and acetylated by treating with an acetylating agent. If this compound is coupled with 1-amino-4-nitrobenzene-2-methylsulfone there is obtained a dyestuff which dyes for example lacquers red tints. Such dyestuffs may for instance also be used for printing acetate silk. Dyestuffs with similar properties are also obtained by coupling diazotizes 1-aminonaphthalene-5-methyl- or -ethylsulfone with 2-aminonaphthalene-6-methyl or ethylsulfone.

*Example 5*

277 parts of 1-aminobenzene-2,4-diethyldisulfone are converted into the diazo-compound in solution in hydrochloric acid or sulfuric acid. To the solution is gradually added whilst stirring well a solution of 239 parts of 1-amino-5-hydroxynaphthalene-2-sulfonic acid, made acid with acetic acid. Coupling occurs quickly and may be accelerated by addition of an acid binding or buffering agent. When no further diazo-compound can be detected the whole is neutralized with sodium carbonate and the dyestuff precipitated if necessary by salting out. It is filtered and dried. The dyestuff of the formula

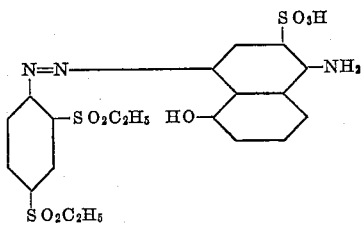

is a dark powder soluble in water and in pyridine to a blue solution and dyeing wool in an acid bath fast blue tints.

*Example 6*

339 parts of 1-aminobenzene-2,4-benzylethyldisulfone are diazotized by means of 70 parts of sodium nitrite and 250 parts by volume of concentrated hydrochloric acid with addition of ice in the usual manner. The diazo-solution thus obtained is coupled with a solution acid with acetic acid of 239 parts of 1-amino-5-hydroxynaphthalene-2-sulfonic acid. Coupling may be hastened by addition of sodium acetate. The whole is neutralized with sodium carbonate when the reaction is complete and the precipitated dyestuff of the formula

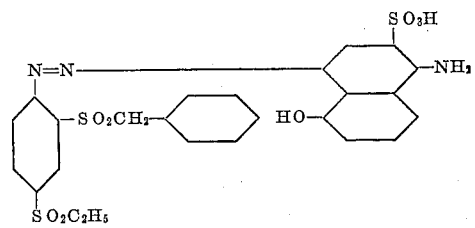

is filtered and dried. It is a black powder soluble in water and in pyridine to a blue solution and dyeing wool in an acid bath fast blue tints.

*Example 7*

305 parts of 1-aminobenzene-2,4-dipropyldisulfone are converted into the diazo-compound in hydrochloric acid solution or sulfuric acid solution. To this solution there is added gradually whilst stirring a solution acid with acetic acid of 239 parts of 1-amino-5-oxynaphthalene-2-sulfonic acid. The coupling is complete in a short time. The whole is neutralized with sodium carbonate and the precipitated dyestuff is filtered. When dry it is a dark powder soluble in water and in pyridine to a blue solution and dyeing wool in an acid bath blue tints. The new dyestuff corresponds to the formula

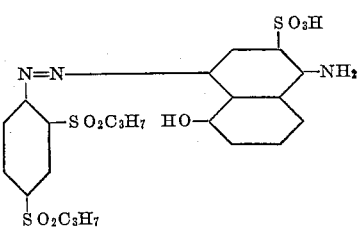

*Example 8*

333 parts of 1-aminobenzene-2,4-dibutyldisulfone are diazotized by means of 70 parts of sodium nitrite and 250 parts by volume of concentrated hydrochloric acid with addition of ice in the usual manner. The diazo solution is coupled with a solution acid with acetic acid of 239 parts of 1-amino-5-hydroxynaphthalene-2-sulfonic acid. The coupling may be accelerated by the addition of sodium acetate. By neutralization of the mass with sodium carbonate the dyestuff is precipitated. It is filtered and dried. The new dyestuff of the formula

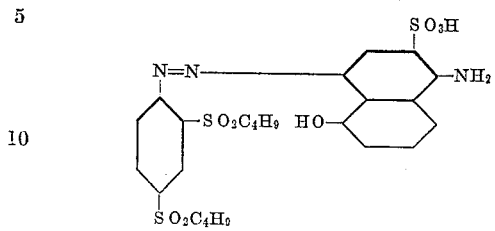

is a dark powder soluble in water and in pyridine to a blue solution and dyeing wool in an acid bath fast blue tints.

Example 9

277 parts of 1-aminobenzene-2,4-diethyldisulfone are converted into the diazo-compound and the diazo-solution is coupled with a solution of 215 parts of the product obtained by treating 1,5-aminonaphthol with epichlorhydrin in boiling butyl alcohol. The dyestuff is filtered and washed until neutral. In a fine state of dispersion it dyes acetate artificial silk pure blue shades which are fast to light and capable of white discharge. The new dyestuff corresponds to the formula

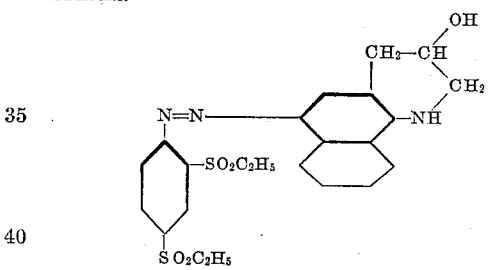

and is soluble in organic solvents such as acetic ester, pyridine and the like, to blue solutions.

A similar dyestuff is obtained if instead of the 1-aminobenzene-2,4-diethyldisulfone a corresponding quantity of the 1-aminobenzene-2,4-dimethyldisulfone is used.

Instead of the condensation product from 1,5-aminonaphthol and epichlorhydrin other products of alkylating 1,5-aminonaphthol may be used, for instance the condensation product with ethylene chlorhydrin, ethyl chloracetate, chloracetamide or the like.

Example 10

2.5 parts of the dyestuff obtained as described in Example 5 are dissolved in 1000 parts of boiling water. The bath is made up with 2500 parts of water at 50–60° C. and the dissolved dyestuff is added, being washed in with 500 parts of water. To the dye bath containing 4000 parts of liquor there are added 10 parts of crystallized sodium sulfate and 100 parts of wool are then entered at 50–60° C. followed by 40 parts of sulfuric acid of 10 per cent. strength. The bath is heated gradually to 85–90° C. and dyeing is conducted at this temperature for one hour. The finishing operations are as usual and the tint obtained is bluish Bordeaux.

Example 11

10 parts of the dyestuff made as described in Example 9 are stirred with addition of a suitable dispersing agent, for instance Turkey red oil, sulfite cellulose lye or the sulfonation products from the residues of the benzaldehyde manufacture, so as to form a uniform paste containing 20 per cent. of dyestuff. 1 part of this paste is intimately mixed with 10 parts of water at 50° C. and so much concentrated soap solution that the dye bath which is to be made corresponds with a soap solution of 2 parts per mile. The whole is now diluted with cold water to about 300 yards. Into the emulsion thus made there are entered 10 parts of acetate artificial silk yarn and after handling the dye bath is heated in the course of ¾ hour up to 80–85° C. and dyeing is conducted for about ¼ hour at this temperature. The usual rinsing and brightening follow. There is obtained a vivid blue tint.

What we claim is:—

1. The mono-amino-mono-azo-dyestuffs of the general formula

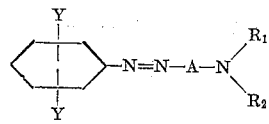

in which each of the two Y's stands for a —$SO_2$—R group, R standing for a member of the group of radicals consisting of alkyl, aralkyl and aryl, in which further the two Y's do not stand in ortho-position to each other, but at the most one of the two Y's stands in ortho-position to the —N=N-group, A stands for a member of the group of nuclei consisting of the benzene and naphthalene series, and $R_1$ and $R_2$ stand for members selected from the group consisting of hydrogen, alkyl, aryl and aralkyl the expressions aryl and "ar" in aralkyl representing monocyclic radicals of the benzene series, which products are orange-red to black powders soluble in pyridine to yellow to orange, to red, to blue, to violet and glue green solutions dyeing the fiber similar tints.

2. The mono-amino-mono-azo-dyestuffs of the general formula

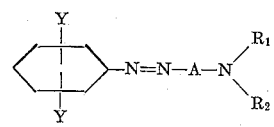

in which each of the two Y's stands for a —$SO_2$—R group, R standing for a member of the group of radicals consisting of alkyl, aralkyl and aryl, in which further the two Y's do not stand in ortho-position to each other, one Y stands in ortho-position to the —N=N-group and the other Y does not stand in ortho-position to the —N=N-group, A stands for a member of the group of nuclei consisting of the benzene and naphthalene series, and $R_1$ and $R_2$ stand for members selected from the group consisting of hydrogen, alkyl, aryl and aralkyl the expressions aryl and "ar" in aralkyl representing monocyclic radicals of the benzene series, which products are orange-red to black powders soluble in pyridine to yellow to orange, to red, to blue, to violet and blue-green solutions dyeing the fiber similar tints.

3. The mono-amino-mono-azo-dyestuffs of the general formula

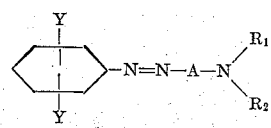

in which each of the two Y's stands for a —SO₂—R group, R standing for a member of the group of radicals consisting of alkyl, aralkyl and aryl, in which further the two Y's do not stand in ortho-position to each other, one Y stands in ortho-position to the —N=N-group and the other Y does not stand in ortho-position to the —N=—-group, A stands for a nucleus of the naphthalene series, R₁ for a member selected from the group consisting of hydrogen, alkyl, aryl and aralkyl the expressions aryl and "ar" in aralkyl representing monocyclic radicals of the benzene series, and R₂ for a hydrogen atom, which products are dark powders, soluble in pyridine to red to violet to green solutions and dyeing the fiber similar tints.

4. The mono-amino-mono-azo-dyestuffs of the general formula

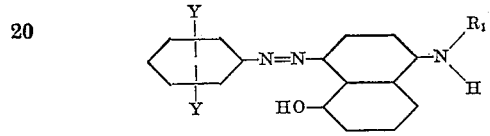

in which each of the two Y's stands for a —SO₂—R group, R standing for a member of the group of radicals consisting of alkyl, aralkyl and aryl, the expressions aryl and "ar" in aralkyl representing monocyclic radicals of the benzene series,, in which further the two Y's do not stand in ortho-position to each other, one Y stands in ortho-position to the —N=N-group and the other Y does not stand in ortho-position to the —N=N-group and —R₁ stands for a member selected from the group consisting of hydrogen and alkyl, which products are black powders soluble in pyridine to blue, violet and green-blue solutions, dyeing the fiber similar tints.

5. The mono-amino-mono-azo-dyestuffs of the general formula

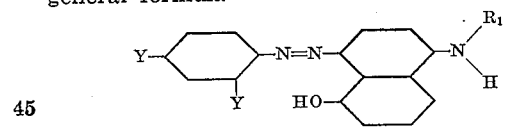

in which each of the two Y's stands for a —SO₂—R group, R standing for a member of the group of radicals consisting of alkyl, aralkyl and aryl, the expressions aryl and "ar" in aralkyl representing monocyclic radicals of the benzene series, and R₁ stands for a member selected from the group consisting of hydrogen and alkyl, which products are black powders soluble in pyridine to blue, violet and gree-blue solutions, dyeing the fiber similar tints.

6. The mono-amino-mono-azo-dyestuffs of the general formula

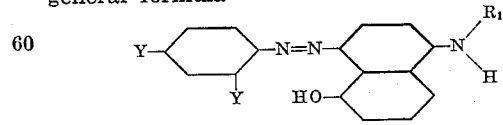

in which each of the two Y's stands for a —SO₂—R group, R standing for a member of the group of radicals consisting of alkyl, aralkyl and aryl, the expressions aryl and "ar" in aralkyl representing monocyclic radicals of the benzene series, R₁ stands for a member selected from the group consisting of hydrogen and alkyl, and in which the naphthalene radical carries a sulfonic group, which products are dark powders soluble in water to violet to green-blue solutions and dyeing wool from an acid bath similar tints.

7. The mono-amino-mono-azo-dyestuffs of the general formula

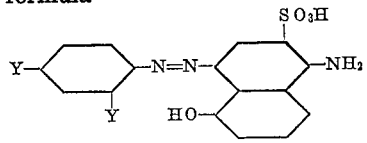

in which each of the two Y's stands for a —SO₂—R group, R standing for a member of the group of radicals consisting of alkyl, aralkyl and aryl, the expressions aryl and "ar" in aralkyl representing monocyclic radicals of the benzene series, which products are dark powders soluble in water to violet to green-blue solutions and dyeing wool from an acid bath similar tints.

8. The mono-amino-mono-azo-dyestuffs of the general formula

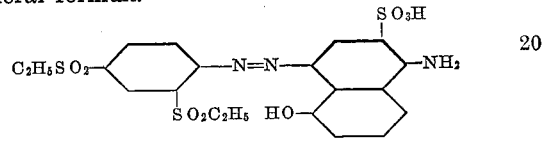

which product dissolves in water to a blue solution and dyes wool from an acid bath fast blue tints.

9. The mono-amino-mono-azo-dyestuffs of the general formula

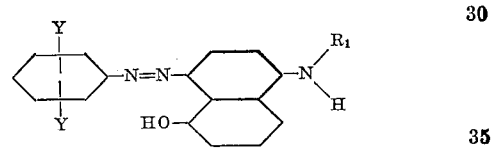

in which each of the two Y's stands for a —SO₂—R group, R standing for a member of the group of radicals consisting of alkyl, aralkyl and aryl, the expressions aryl and "ar" in aralkyl representing monocyclic radicals of the benzene series, in which further the two Y's do not stand in ortho-position to each other, one Y stands in ortho-position to the —N=N-group and the other Y does not stand in ortho-position to the —N=N-group R₁ stands for a member selected from the group consisting of hydrogen and alkyl, and carries neither sulfonic groups nor carboxylic groups, which products are soluble in pyridine to blue solutions and dye acetyl cellulose blue tints.

10. The mono-amino-mono-azo-dyestuffs carrying neither sulfonic acid groups nor carboxylic acid groups of the formula

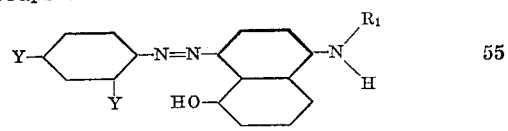

in which each of the two Y's stands for a —SO₂-alkyl group, and R₁ stands for a member selected from the group consisting of hydrogen and alkyl, which products are soluble in pyridine to blue solutions and dye acetyl cellulose blue tints.

11. The mono-amino-mono-azo-dyestuffs carrying neither sulfonic acid groups nor carboxylic acid groups of the general formula

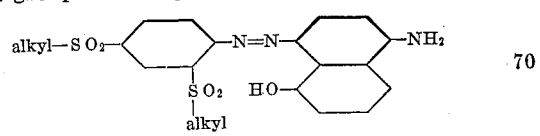

which products are soluble in pyridine to blue solutions and dye acetyl cellulose blue tints.

12. The dyestuffs of the formula
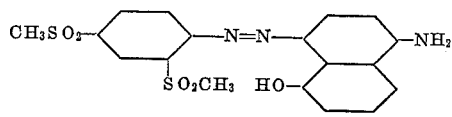
which product is a dark powder, soluble in pyridine to a blue solution and dyeing acetyl cellulose blue tints.
FRIEDRICH FELIX.
RUDOLF von CAPELLER.
WILHELM HUBER.